United States Patent
Glinke et al.

(10) Patent No.: US 12,011,012 B2
(45) Date of Patent: Jun. 18, 2024

(54) METHOD AND SYSTEM FOR DIRECTLY HEATING A PROTEIN-ENRICHED MILK PRODUCT BY INTRODUCING STEAM INTO SAID MILK PRODUCT

(71) Applicant: GEA TDS GmbH, Sarstedt (DE)

(72) Inventors: Dennis Glinke, Hannover (DE); Ulrich Rolle, Everswinkel (DE); Jurgen Gehling, Stadtlohn (DE); Ludger Tacke, Velen (DE); Hubert Assing, Ahaus (DE)

(73) Assignee: GEA TDS GmbH, Sarstedt (DE)

( * ) Notice: Subject to any disclaimer, the term of this patent is extended or adjusted under 35 U.S.C. 154(b) by 0 days.

(21) Appl. No.: 17/629,682

(22) PCT Filed: Jul. 10, 2020

(86) PCT No.: PCT/EP2020/000130
§ 371 (c)(1),
(2) Date: May 20, 2022

(87) PCT Pub. No.: WO2021/013377
PCT Pub. Date: Jan. 28, 2021

(65) Prior Publication Data
US 2022/0378057 A1 Dec. 1, 2022

(30) Foreign Application Priority Data
Jul. 24, 2019 (DE) .................... 10 2019 005 133.5

(51) Int. Cl.
*A23C 3/037* (2006.01)
*A23C 3/00* (2006.01)
*A23C 3/04* (2006.01)

(52) U.S. Cl.
CPC .............. *A23C 3/037* (2013.01); *A23C 3/005* (2013.01); *A23C 3/045* (2013.01)

(58) Field of Classification Search
CPC .......... A23C 3/037; A23C 3/005; A23C 3/045
(Continued)

(56) References Cited

U.S. PATENT DOCUMENTS

| 5,443,857 A | 8/1995 | Arph et al. |
| 9,011,953 B2 | 4/2015 | Kowalik et al. |

FOREIGN PATENT DOCUMENTS

| CN | 1105192 A | 7/1995 |
| CN | 103636781 A | 3/2014 |

(Continued)

OTHER PUBLICATIONS

Lee, A. P., et al.,, "The influence of ultra-pasteurization by indirect heating versus direct steam injection on skim and 2% fat milks", J. Dairy Sci. 100, pp. 1688-1701 (2017).

(Continued)

*Primary Examiner* — Brent T O'Hern
(74) *Attorney, Agent, or Firm* — Young Basile Hanlon & MacFarlane, P.C.

(57) ABSTRACT

Directly heating a protein-enriched milk product occurs by introducing steam, the direct heating taking the form of an infusion or injection method. The described technique significantly extends service time, ensuring a content of non-denatured whey proteins in the treated protein-enriched milk product greater than that obtained in the prior art. The milk product, which is preheated and kept at temperature is indirectly cooled before direct heating by a recuperative cooling step from the preheating temperature to a cool-down temperature with a temperature difference ranging from 5 K to 10 K. The direct heating from the cool-down temperature to the high pasteurization temperature is controlled by direct heating setting parameters which are known per se. Finally, (Continued)

the milk product is cooled by flash cooling from the high pasteurization temperature to a necessarily required exit temperature.

10 Claims, 6 Drawing Sheets

(58) Field of Classification Search
USPC ........................................................ 426/384
See application file for complete search history.

(56) References Cited

FOREIGN PATENT DOCUMENTS

| CN | 109042874 A | 12/2018 |
|---|---|---|
| DE | 10 2007 017 704 A1 | 10/2008 |
| DE | 10 2010 008 448 A1 | 8/2011 |
| EP | 0 617 897 A1 | 10/1994 |
| EP | 0617897 A1 * | 10/1994 |
| EP | 0 958 745 A2 | 11/1999 |
| EP | 0 794 706 B1 | 8/2000 |
| WO | 2011/101077 A1 | 8/2011 |
| WO | 2018/115131 A1 | 6/2018 |

OTHER PUBLICATIONS

Kelleher, Clodagh M., et al.., "A comparison of pilot-scale supersonic direct steam injection to conventional steam infusion and tubular heating systems for the heat treatment of protein-enriched skim milk-based beverages", Innovative Food Science and Emerging Technologies 52, pp. 282-287 (2019).

Duric, Mirjana, et al., Analysis of Energy Consumption During Milk Processing in UHT-Plant with Two Recuperators, APTEFF, 36, pp. 23-32 (2005).

Hilton, Deeth, "Optimum Thermal Processing for Extended Shelf-Life (ESL) Milk", Foods 2017, 6, I02, 22 pgs.

Changquan Tao, "Secondary Sterilization Processes in Milk and Milk Products Processing", China Dairy Industry, vol. 22, No. 3, published Jun. 25, 1994, pp. 116-119.

Office Action in corresponding CN Application No. 202080053274.0, dated Aug. 29, 2023, and its English translation, 17 pgs.

* cited by examiner

FIG. 10A
III

Experiment I
FIG. 8A

FIG. 8B

METHOD AND SYSTEM FOR DIRECTLY HEATING A PROTEIN-ENRICHED MILK PRODUCT BY INTRODUCING STEAM INTO SAID MILK PRODUCT

TECHNICAL FIELD

The invention relates to a method for directly heating a protein-enriched milk product by introducing steam into said milk product, wherein, during the direct heating, the steam heats the milk product to produce a germ-free state by means of direct high-temperature pasteurization to a high pasteurization temperature. Furthermore, the invention relates to a system for carrying out the method.

BACKGROUND

In recent years, there has been a trend among consumers toward the consumption of protein-enriched milk products that necessitate special requirements with regards to the required thermal treatment for extending their storage stability and shelf life. A protein-enriched milk product is understood to mean, for example, raw milk as the starting product for the heat treatment according to the present invention that has a content of (acid-soluble) β-lactoglobulin in a range from 6.85 to 8.35 g/kg milk, as the measured values from three experiments cited in the following show. However, A. Schmid and H. Mayer, Diplomarbeit, Bestimmung von Furosin und anderen Erhitzungsindikatoren in Milch mittels HPLC, University of Vienna, May 2009, reveals that the average value for the content of native β-lactoglobulin from seven investigated raw milk samples that came directly from farms or organic food stores with the designation "raw milk" is 4.02 g/dm$^3$ milk ($\approx$3.9 g/kg milk) ("Schmid").

Protein-enriched milk products are sensitive to heat and have a tendency to scorch, preferably at temperatures above 100° C. In other words, under these conditions, deposits tend to form on the walls of the process apparatuses used for heat-treating, conveying, and guiding the flow of the milk product. This formation of deposits is also referred to as product fouling. The product fouling reduces the service time or operating time of the affected process apparatuses between two cleaning cycles. In the following, when reference is made merely to milk products within the context of the present invention, the feature "protein-enriched" can always be implied as well.

The direct heating of milk products by means of steam is a known and commonly used method. It serves to extend the shelf life of said milk products or the end products derived therefrom. The heat treatment by means of the heating medium of steam (preferably saturated steam, but also in the overheated state) can be done using a wide variety of methods, either directly or indirectly (Heinz-Gerhard KESSLER, Lebensmittel-Verfahrenstechnik, Schwerpunkt Molkereitechnologie, 1st edition, Munich-Weihenstephan, Verlag A. Kessler, 1976, pp. 154 to 159) ("Kessler"). The indirect methods include, for example, heating using different types of heat exchanger (recuperators: for example shell and tube heat exchangers; plate heat exchangers). The direct methods comprise two main groups, namely the injection method by means of steam (pp. 154, 155) and the infusion method by means of steam (p. 156).

On account of the direct heat exchange between the steam and the milk product, said milk product is heated directly, quickly and efficiently. As a result of this quick method, the treatment time can be reduced, which overall results in reduced exposure of the milk product to heat and thus in a milk product that retains a high level of quality, above all with respect to the flavor. The fast and gentle heat treatment in the direct heating method comes at the price of a higher energy consumption compared with the indirect heating method.

In the injection method, the food product to be heated is conveyed by means of an injector. The steam is injected directly into the food product at a higher pressure for the purpose of heating, which food product preferably acts as a propulsive jet in this case, and the heat exchange between the mixing material flows ends in a so-called mixing chamber (DE 10 2007 017 704 A1).

In the infusion method, in which infusion heating is used, the finely dispersed milk product is heated in a steam chamber. The pressure of the steam and of the product system are almost identical in this method. As such, the temperature difference between the heating medium and the milk product is significantly less than in the injection method, resulting in gentler product treatment. The disadvantages of the infusion method compared with the injection method are more complicated process engineering and higher investment costs. Saskia SCHWERMANN and Uwe SCHWENZOW provide an overview of the method concepts for sterilizing food products, in particular also taking into account direct heating methods of the type described above, in "Verfahrenskonzepte zur Herstellung von ESL-Milch", article in three sections in Deutsche Milchwirtschaft, 11/2008 to 13/2008 (59th volume) ("Schwermann").

EP 0 958 745 A2 discloses a UHT method for milk-based products, in which the milk is preheated to 65-85° C., the temperature is increased to 85-105° C. by means of steam injection, subsequently the milk is kept at this temperature and stabilized and, subsequently, high-temperature pasteurization to a temperature of 140-145° C. takes place in an infuser. After a holding time in a range from 3-90 seconds, the product is led into a vacuum chamber, where it is decompressed, in the process cooled, and an amount of water corresponding to the amount of steam supplied in the previous sterilization process is thereby removed from the product. In the further course of the process, the product is homogenized and cooled down again.

WO 2018/115 131 A1 describes a system and a method for heating liquid milk concentrates, wherein the product is preheated to a temperature of 5-75° C., subsequently subjected to direct heat treatment with steam in an infuser, and from there kept at temperature on its way to a vacuum chamber. In the vacuum chamber, water is removed from the product in a manner known per se by means of decompression and cooling and the product is then cooled further.

EP 0 617 897 A1, which is considered the closest prior art, discloses a method and a system for directly heating a milk-based product. Here, the product is initially preheated prior to the direct heating with steam. After the direct heating, the product is initially indirectly cooled before finally being cooled to an end temperature by means of flash cooling.

Other relevant prior art includes: KELLEHER, C. M. et al., A comparison of pilot-scale supersonic direct steam injection to conventional steam infusion and tubular heating systems for the heat treatment of protein-enriched skim milk-based beverages; Innovative Food Science and emerging Technologies, vol. 52, 2019, p. 282-290,-ISSN 1466-8564 ("Kelleher") and LEE, A. P. et al., The influence of ultra-pasteurization by indirect heating versus direct steam injection on skim and 2% fat milks; Journal of Dairy Science, vol. 100, 2017, p. 1688-1701,-ISSN 0022-0302 ("Lee").

Kelleher discloses, in FIG. 1, flow diagrams for treating protein-enriched milk drinks by means of steam infusion and steam injection (see p. 283, right-hand col., last para.; p. 284, FIG. 1; p. 285, Tab. 1; p. 285, left-hand col. to p. 286, left-hand col., first para.; p. 286, FIG. 2). Lee also discloses a heating method for milk by means of direct heating with steam (see FIG. 1).

Lee also discloses a heating method for milk by means of direct heating with steam (see FIG. 1, right-hand side. A step of preheating the milk is followed by direct heating with steam and then vacuum cooling).

The denaturation of some whey proteins contained in the milk starts at a temperature of 65° C., wherein the main source of the released SH groups is the β-lactoglobulin, which is fully denatured and experiences a maximum in terms of the development of the scorched taste at 130° C. With regard to the heating process, this has a significant influence on the operating and production time, because temperatures of over 75° C. (≥75° C.) increasingly denature whey proteins, which are then deposited on the walls of the heaters. This product fouling, which was mentioned at the outset, results in the growth of an ever-thicker fouling layer at longer operating times, as a result of which the transfer of heat in the heater continuously deteriorates.

To prevent this effect, the milk product is kept at 80° C. to 90° C. A typical temperature-time combination here is 90° C. for 120 seconds. This or a similar measure is not disclosed in Schwermann; however, it should be considered prior art (EP 0 958 745 A2). This temperature range forces targeted denaturation of the whey proteins, which then bind to a specific part of the caseins (k-casein). Caseins make up approx. 80% of the total protein content of the milk and are heat-stable unlike the whey proteins.

In the case of protein-enriched milk or milk products according to the present invention, the protein content increases and therefore so does the content of heat-unstable whey proteins.

A comparison of indirect and direct milk heating reveals that the proportion of denatured β-lactoglobulin is significantly higher in indirect milk heating than in direct milk heating, at 83% compared with 66%, respectively (see Kessler, pp. 132, 133).

The degree of denaturation of the milk products correlates with the degree and intensity of the heat treatment, i.e., with the respectively applied heat treatment, wherein the degree of the denaturation is quantitatively determined nowadays by means of so-called heating indicators. These heating indicators include, in particular, the acid-soluble β-lactoglobulin (non-denatured β-lactoglobulin) and furosine. They serve as an indicator for estimating and monitoring the actual thermal load on milk products with an extended shelf life. It is an established fact that the degree of denaturation decisively determines the nutritional and sensorial quality of the milk products. There is a confirmed relationship between the content of furosine and the content of non-denatured β-lactoglobulin, which is determined in the same milk product treated in the same manner. An increase in the furosine content is associated with a decrease in the β-lactoglobulin content. The greater the thermal load (temperature and action time), the higher the furosine content, with a simultaneously decreasing β-lactoglobulin content (see Schmid).

BRIEF SUMMARY

An object of the present invention is to provide a method and a system for carrying out the method that have the effect of significantly extending service time in the method process or in the system, and in doing so ensuring a content of non-denatured whey proteins in the treated protein-enriched milk product greater than that obtained in the prior art.

In general, the method includes, during direct heating, the steam heats the milk product to produce a germ-free state by means of direct high-temperature pasteurization to a high pasteurization temperature. Before the direct heating, the milk product is indirectly preheated to a preheating temperature. Following on from the preheating when viewed in the direction of flow of the milk product, a first instance of keeping the preheated milk product at temperature is carried out for a defined and controlled first dwell time. Furthermore, following on from the direct heating to the high pasteurization temperature when viewed in the direction of flow of the milk product, a second instance of keeping the milk product at temperature is carried out for a defined and controlled second dwell time. Subsequently, water in an amount corresponding to that of the previously supplied steam is removed from the high-temperature pasteurized milk product that has been kept at temperature by flash cooling by means of decompression to a lower pressure. A system for carrying out the method comprises, inter alia, a direct heating apparatus as well as a preheater arranged upstream thereof with a first holding tube following on from the preheater in the direction of flow of the milk product. A second holding tube that leads to a vacuum chamber is provided downstream of the direct heating apparatus.

With regards to the method, the invention proceeds from EP 0 617 897 A1 or from a known method for directly heating a liquid food product by means of steam of the like disclosed, for example, in EP 0 794 706 B1 (infusion method) or in WO 2011/101077 A1, which claims priority to DE 10 2010 008 448 A1 (infusion method; injection method). According to both documents, the liquid food product, for example whey protein concentrates, baby food, liquid baby food concentrates, nutritional drinks, or milk for cheese, is heated directly by means of steam so as to produce a germ-free state, wherein water in an amount corresponding to that of the previously supplied steam is removed from the liquid food product by means of decompression to a lower pressure. However, unlike in the prior art cited above, in the subject matter of the present invention, the direct heating step is preceded by a preheating step and, in particular, an additional, preferably defined and controlled first instance of keeping the product at temperature, this step coming after said preheating step in the direction of flow of the milk product.

The object of the invention is solved if, in the method of the generic type, the milk product that is preheated and kept at temperature is indirectly cooled prior to direct heating by means of a recuperative cooling step from the preheating temperature to a cool-down temperature with a temperature difference in a range from 5 Kelvin (K) to 10 K (ΔTK≤(5 to 10) K), the direct heating from the cool-down temperature to the high pasteurization temperature is controlled by means of direct heating setting parameters that are known per se, and the milk product is cooled by flash cooling from the high pasteurization temperature to a necessarily required exit temperature.

The invention thus provides a recuperative cooling step by means of indirect cooling after the first instance of keeping the product at temperature and before pasteurizing same at a high temperature to retain the nutritional and sensorial quality of the treated milk product in the form of non-denatured whey protein to the greatest extent possible. This cooling step from the preheating temperature to a cool-down temperature with a temperature difference in a range from 5 to 10 K yields an unforeseeable and surprising positive result, because, firstly, it reduces the dwell time of the milk product at the high pasteurization temperature and, secondly, reduces further denaturation of the whey proteins as a result.

The subsequent direct heating begins at the level of the cool-down temperature and heats the milk product to the high pasteurization temperature using adjustable direct heating setting parameters that are known per se. According to one embodiment of the method, these are pressure, temperature, and the duration of action of the steam.

During the flash cooling, the milk product treated in this manner must be brought down to a necessarily required exit temperature depending on the steam additionally required by the indirect cooling. This exit temperature ensures that the treated milk product achieves its state with regard to water content from before the high-temperature pasteurization, i.e., before the supply of steam for the high-temperature pasteurization.

At a high pasteurization temperature, which may reach as much as 140° C., the cooling according to the invention of the milk product that has been preheated and kept at temperature from the preheating temperature to the cool-down temperature involves a temperature difference in a range from 5 K to 10 K. The duration of the first dwell time of the milk product in the first instance of keeping same at temperature prior to the high-temperature pasteurization may also influence the magnitude of the specific temperature difference.

A person skilled in the art tasked with implementing the subject matter of the present invention will be able, without exercising inventive skill, to optimize all above-mentioned influencing variables in each case with a view to the service time and a high nutritional and sensorial quality of the heated-treated, protein-enriched milk product in consideration of the specific process conditions and product requirements.

In the exemplary embodiment of the method according to the invention described in detail below, in which the applicable product requirements provide for high-temperature pasteurization from 85° C. to 137.5° C. without the cooling step according to the invention, optimization of the like described above was achieved by means of cooling or with a cooling step involving a temperature difference of 10 K, wherein the first dwell time for the first instance of keeping the product at temperature is 30 seconds and thus the high-temperature pasteurization is carried out from 75° C. to 137.5° C.

A specific, expedient cool-down temperature depends on the specific process data of the direct heating. Said temperature is such that the high-temperature pasteurization from the achieved cool-down temperature to the high pasteurization temperature, which is also required as before unchanged on account of the cooling step according to the invention, is energetically ensured by means of the available direct heating setting parameters that are adjustable within a limited range, such as pressure, temperature, and the duration of action of the steam.

The method step according to the invention advantageously applies equally, as is proposed, to the direct heating by means of a per se known infusion method or a per se known injection method.

The cooling step according to the invention produces the following advantages in combination:
reduced denaturation of the whey proteins (reduced scorched aroma created by the released SH groups);
reduced Maillard reaction (browning);
reduced formation of furosine; and
significant extension of the service time, wherein little to no product fouling is observed after a production time of 5 hours and the maximum service time is extended by two or three times compared with the service time in methods or systems according to the

PRIOR ART

Cooling energy is required for the above-described process and product improvement. The returning warm coolant (preferably cooling water) is used either in the mixing process or regeneratively for heating purposes to improve the entire process from an energy point of view.

A system according to the invention for carrying out the method according to the invention proceeds from EP 0 617 897 A1 or from the combination of the following, per se known features disclosed mainly in the above-cited documents EP 0 794 706 B1 (infusion system) and WO 2011/101077 A1 (infusion system; direct heating with injection device), wherein a first holding tube, which is also known per se, between a preheater and a direct heating apparatus (EP 0 958 745 A2) is not described in said cited prior art:
 a direct heating apparatus for the milk product for direct high-temperature pasteurization by means of steam to a high pasteurization temperature,
 a preheater that is arranged upstream of the direct heating apparatus when viewed in the direction of flow of the milk product and that is designed as a recuperator and that serves to indirectly preheat the milk product to a preheating temperature,
 a first holding tube for a first instance of keeping the preheated milk product at temperature and arranged between the direct heating apparatus and the preheater,
 a first conveying apparatus arranged downstream of the direct heating apparatus for conveying the high-temperature pasteurized milk product,
 a second holding tube arranged downstream of the first conveying apparatus for a second instance of keeping the high-temperature pasteurized milk product at temperature, and
 a vacuum apparatus arranged downstream of the second holding tube and in which water in an amount corresponding to that of the previously supplied steam is subsequently removed from the high-temperature pasteurized milk product that has been kept at temperature by flash cooling by means of decompression to a lower pressure.

With regards to the system, the object of the invention is solved proceeding from the generic system in that a cooler designed as a recuperator is arranged between the direct heating apparatus and the first holding tube, which cooler cools the preheated milk product down from a preheating temperature to a cool-down temperature by means of indirect cooling.

The arrangement according to the invention of the cooler advantageously applies equally, as is proposed, to the direct heating apparatus in the form of a per se known infusion apparatus or in the form of a per se known injection apparatus.

BRIEF DESCRIPTION OF THE DRAWINGS

The invention is represented in more detail by the following description and the appended figures of the drawing and the claims. While the invention is realized in a wide variety of embodiments of a method of the generic type and in a wide variety of embodiments of a system of the generic type for carrying out the method, a preferred exemplary embodiment of the method according to the invention and of the system according to the invention are described in the following based on the drawing.

FIGS. 8A-10B show photographs of product fouling or of the fouling layer in the inlet of the second conveying apparatus arranged downstream of the direct heating apparatus after a production time of 5 hours, wherein two photographs arranged vertically with respect to one another in each case are shown and assigned to the Experiments I to III in the order given.

DETAILED DESCRIPTION

Figure 1:
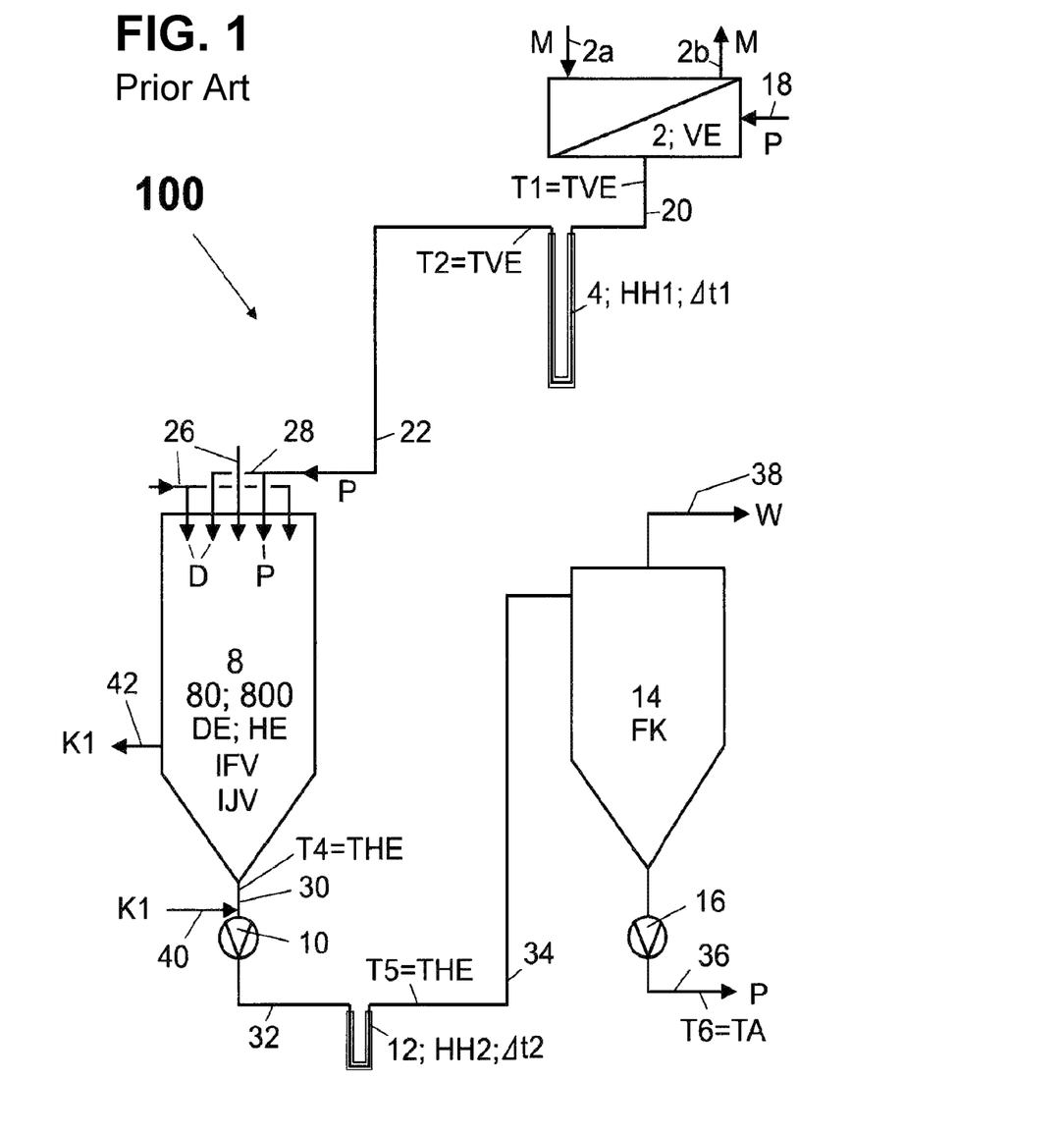
FIG. 1 is a schematic representation of a system according to the prior art for directly heating a protein-enriched milk product by introducing steam into said milk product.

A system 100 known from the cited prior art according to FIG. 1 (insofar as it relates to an infusion apparatus and the other apparatuses arranged downstream hereof) is disclosed, for example, in EP 794 706 B1 and WO 2011/101077 A1. For carrying out the infusion method IFV, the system 100 includes a direct heating apparatus 8 in the form of an infusion apparatus 80 for carrying out high-temperature pasteurization HE within the scope of direct heating DE. The infusion apparatus 80 may comprise a product inlet 28 in its headspace (WO 2010/086082 A1), via which inlet the protein-enriched milk product P to be heat-treated is supplied to said infusion apparatus 80, for example and preferably centrally and annularly. Steam D is supplied to the supplied milk product P radially on the outside and at the same time radially from the inside, for example and preferably via an outer and an inner steam inlet 26, in order to directly heat said product, as a result of which high-temperature pasteurization HE from a preheating temperature T2=TVE to a high pasteurization temperature T4=THE takes place. With regard to the way in which the milk product P and the steam D is supplied, the prior art includes numerous other options that may also be used within the scope of the present invention. The infusion apparatus 80 is supplied with a first coolant K1 via a first coolant inlet 40 to a coolant chamber on the base of the container for cooling a base of the infusion apparatus 80. The first coolant K1 is discharged via a first coolant outlet 42.

An outlet opening on the lower end of the infusion apparatus 80 is connected via an outlet pipe 30 to a first conveying apparatus 10, for example a rotating positive displacement pump or a centrifugal pump, which is connected via a third product line portion 32 to a second holding tube 12 for a second instance HH2 of keeping the product at temperature for the purpose of maintaining the high pasteurization temperature T5=THE for a second dwell time Δt2. The second holding tube 12 leads via a fourth product line portion 34 to a vacuum chamber 14. The second conveying apparatus 10 conveys the high-temperature pasteurized milk product P that has been kept at the high pasteurization temperature THE from the infusion apparatus 80 to the vacuum chamber 14. The vacuum chamber 14 is designed to remove, by means of so-called flash cooling FK, from the milk product P being cooled by means of a pressure drop, the amount of water W that is supplied to the infusion apparatus 80 as steam D in the form of exhaust vapors, and to discharge said vapors via a vapor outlet 38 preferably arranged in the upper region. A milk product P treated in this manner exits the vacuum chamber 14 at an exit temperature T6=TA via a discharge line 36, which is arranged in the lower region of said chamber on a tapering base and which leads through a second conveying apparatus 16.

The milk product P to be heat-treated enters the system 100 via a milk product inlet 18 at a preheater 2 for preheating VE the product to the preheating temperature T1=TVE. The preheater 2 leads via a first product line portion 20 to a first holding tube 4 for the first instance HH1 of keeping the product at temperature for the purpose of maintaining the preheating temperature T2=TVE for a first dwell time Δt1. The first holding tube 4 opens out into the headspace of the infusion apparatus 80 via a second product line portion 22 and the product inlet 28 downstream thereof. The preheater 2 is fed with a preferably regenerative heat transfer medium M via a heat transfer medium inlet 2a and a heat transfer medium outlet 2b.

As an alternative to the above-described infusion apparatus 80, the direct heating apparatus 8 of the system 100 (FIG. 1) may be designed in the form of an injection apparatus 800 for carrying out an injection method IJV. In this per se known design, the milk product P enters the injection apparatus 800 via the product inlet 28 for the purpose of high-temperature pasteurization HE and preferably forms a propulsive jet in said apparatus. The propulsive jet flows through a mixing chamber of the injection apparatus 800, wherein the heating medium, i.e., the steam D, is made to flow by a pressure drop caused by the speed of the milk product P in the form of a propulsive jet to be introduced into the milk product P. The steam inlet 26 also leads to the mixing chamber, where the steam D acts on the propulsive jet, preferably laterally.

A system 1000 according to the invention (FIG. 2) for directly heating DE the protein-enriched milk product P by introducing steam D into said milk product P proceeds in an identical manner from the known system 100 according to FIG. 1, with the reference signs being carried over unchanged. In order to avoid repetitions, only the differences between the system 1000 according to the invention and the known system 100 will be described in the following.

Figure 2:
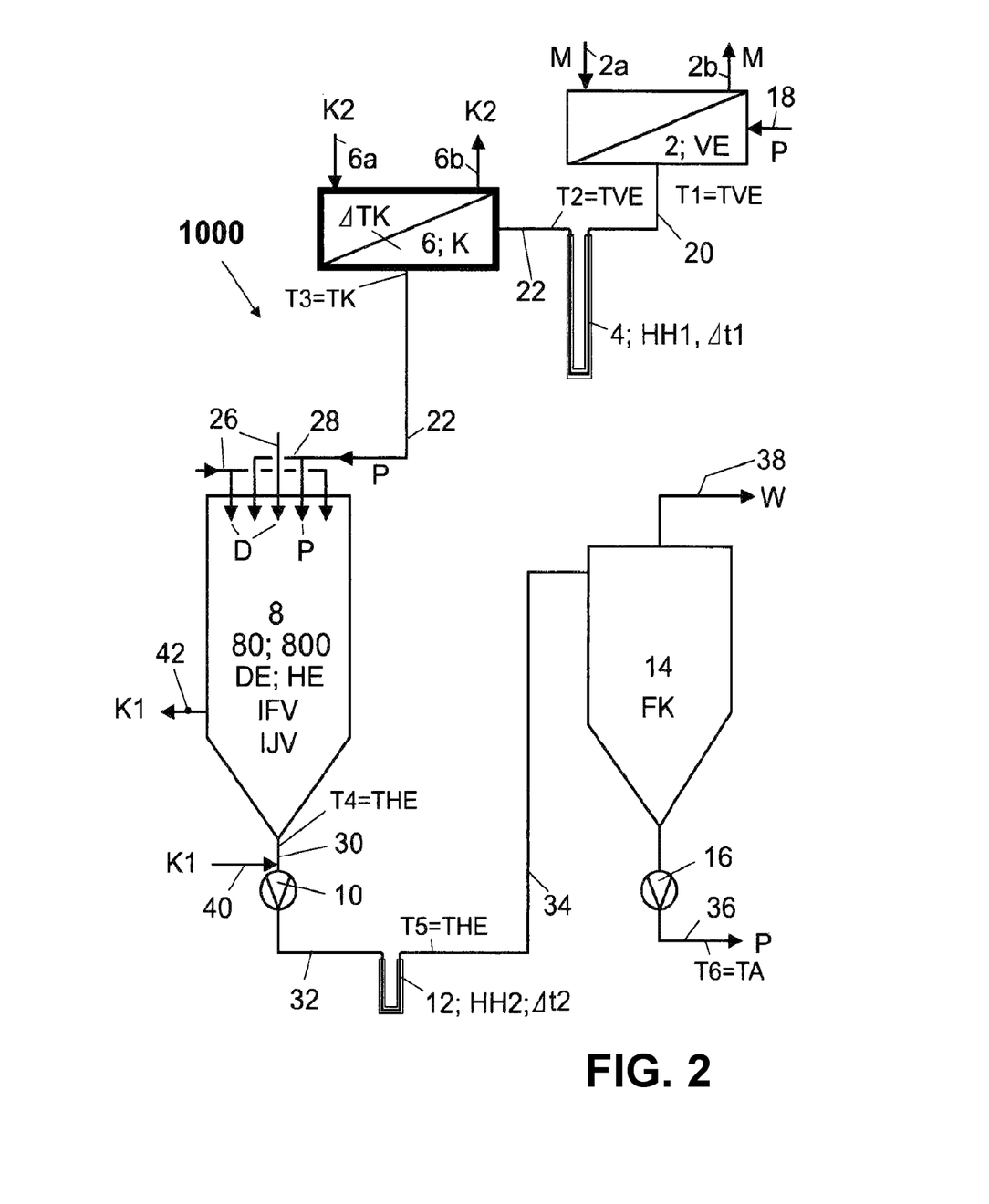
FIG. 2 is a schematic representation, proceeding from the known system according to FIG. 1, of the system according to the invention having a cooler arranged according to the invention.

A cooler 6 designed as a recuperator is arranged between the direct heating apparatus 8, 80, 800 and the first holding tube 4, the product side of which cooler is guided via the second product line portion 22. The cooler 6 is supplied with a second coolant K2, preferably cold water, via a second coolant inlet 6a and a second coolant outlet 6b and it has the function of cooling down the milk product P that has been preheated and kept at temperature by a temperature difference ΔTK from the preheating temperature T2=TVE to a cool-down temperature T3=TK by means of indirect cooling K.

Experiments that serve to prove that the goals formulated with the object according to the invention have been achieved were carried out using the system 1000 according to the invention. Three of these experiments, which were carried out on consecutive days and which are denoted as Experiment I, II, and III, are referred to below with regard to a selection of relevant results and measured values.

Experiments I, II and III—Overview

Figure 3:
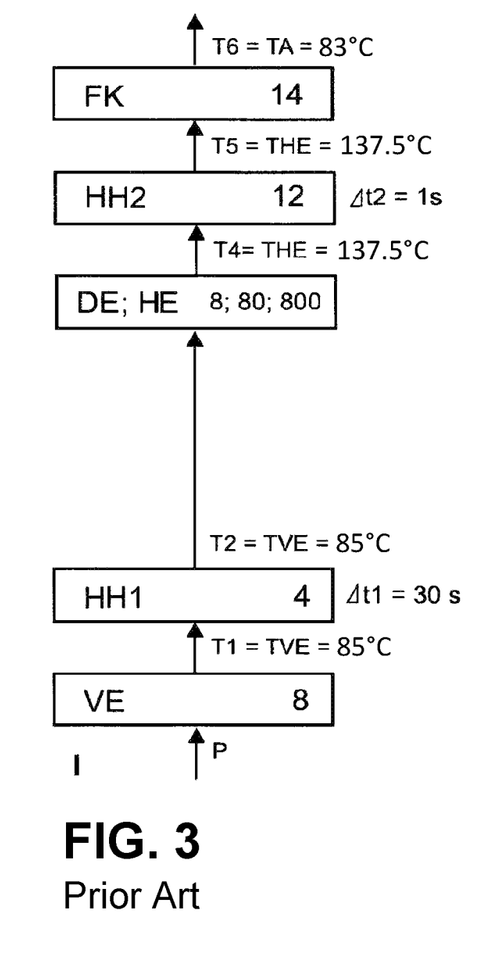
FIG. 3 is a block diagram of the method according to the prior art (Experiment I).
Figure 3A:
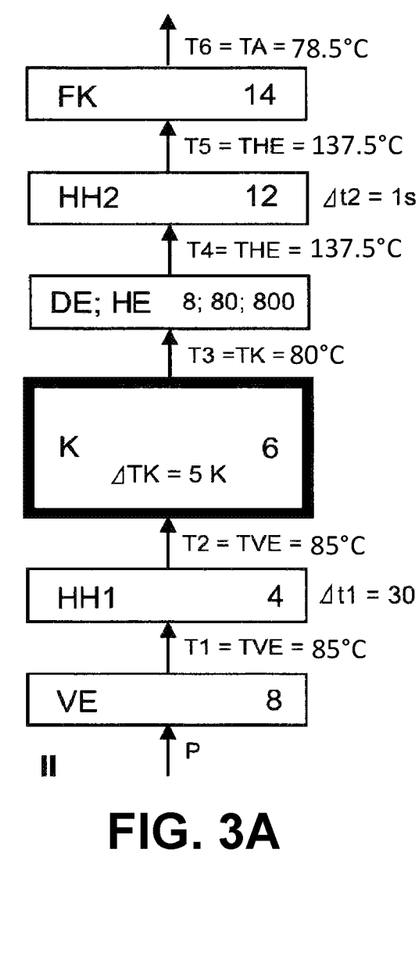
FIG. 3A is a block diagram of the method according to the invention comprising cooling by ΔTK=5 K (Experiment II).
Figure 3B:
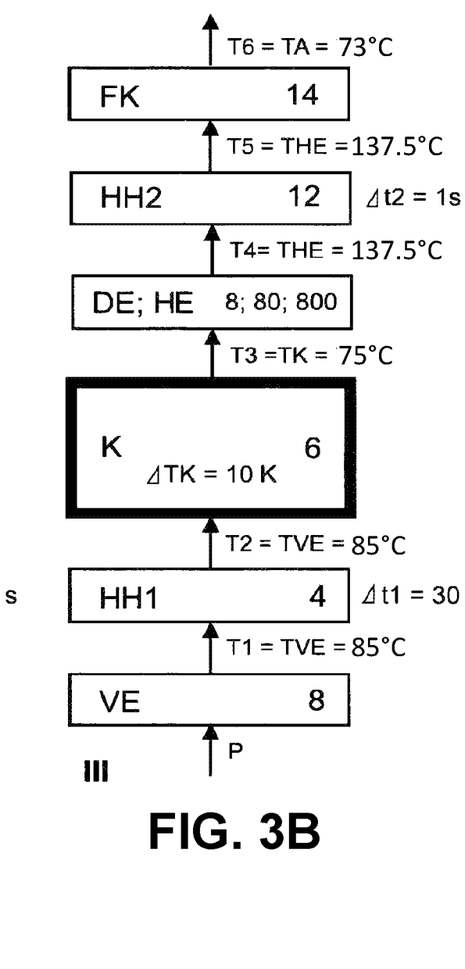
FIG. 3B is a block diagram of the method according to the invention comprising cooling by ΔTK=10 K (Experiment III).
Figure 4:
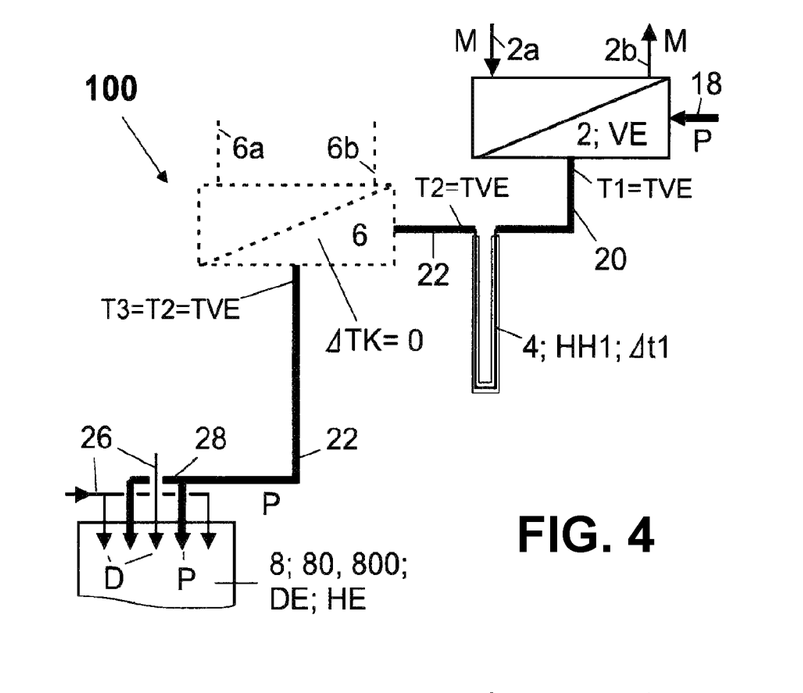
FIG. 4 shows a detail from the system according to FIG. 2 in the region upstream of a direct heating apparatus for carrying out the method according to the prior art, without cooling of or a cooling procedure performed on the milk product that has been preheated and kept at temperature.

The first experiment (without cooling K) used the process sequence according to FIGS. 3 and 4 and is referred to as Experiment I. The second experiment (with cooling K) used the process sequence according to FIGS. 3A and 5 and is referred to as Experiment II. The third experiment (with cooling K) used the process sequence according to FIGS. 3B and 5 and is referred to as Experiment III.

In Experiment I, the milk product P that has been preheated to the preheating temperature T2=TVE and kept at temperature is guided through the "inactive" cooler 6 via the second product line portion 22 without cooling K and supplied to the direct heating apparatus 8 designed as an infusion apparatus 80 at the preheating temperature T2=TVE.

Figure 5:
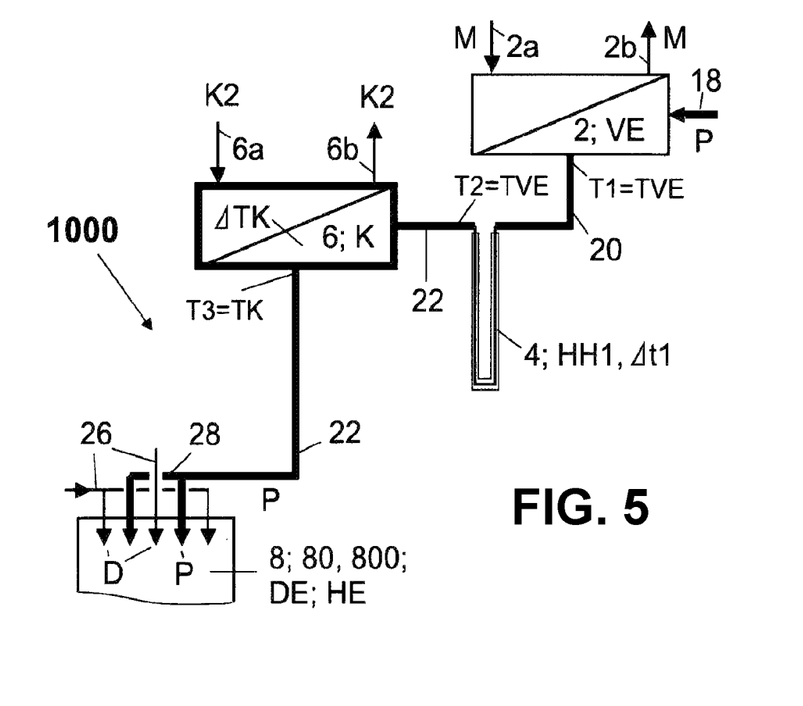
FIG. 5 shows the detail from the system according to FIG. 2 for carrying out the method according to the invention, with the cooling according to the invention of the milk product that has been preheated and kept at temperature by means of the cooler arranged according to the invention.

In Experiments II and III, the milk product P that has been preheated to the preheating temperature T2=TVE and kept at temperature is in each case guided via the second product line portion 22 through the "active" cooler 6, where it is indirectly cooled K by the temperature difference ΔTK to the cool-down temperature T3=TK. The temperature difference ΔTK in Experiment II differs from that in Experiment III. The milk product P enters the direct heating apparatus 8 designed as an infusion apparatus 80 at the relevant cool-down temperature T3=TK.

All relevant temperatures and dwell times in Experiments I to III for the heat treatment of the protein-enriched milk product P, from the preheating VE in the preheater 2 at the preheating temperature T1=TVE to the treated milk product P in the discharge line 36 at an exit temperature T6=TA (FIG. 1, 2), are compiled in the following Table 1. For the heat treatment, the following applies, among other things: Experiment I: TVE−TA=2 K; Experiment II: TK−TA=1.5 K; Experiment III: TK−TA=2 K.

TABLE 1

| Experiment | TVE in ° C. | Δt1 in s | TK in ° C. | THE in ° C. | Δt2 in s | TA in ° C. |
|---|---|---|---|---|---|---|
| I | 85 | 30 | — | 137.5 | 1 | 83 |
| II | 85 | 30 | 80 | 137.5 | 1 | 78.5 |
| III | 85 | 30 | 75 | 137.5 | 1 | 73 |

Experiment Results

A selection of the measured values obtained in Experiments I to III is given in Table 2 below. The relevant heating indicators, namely non-denatured β-lactoglobulin and furosine, for estimating and monitoring the actual thermal load on milk products and their significance for the nutritional and sensorial quality of said milk products have already been addressed above. The associated measured values obtained in Experiments I to III are highlighted in gray in Table 2.

Figure 6:
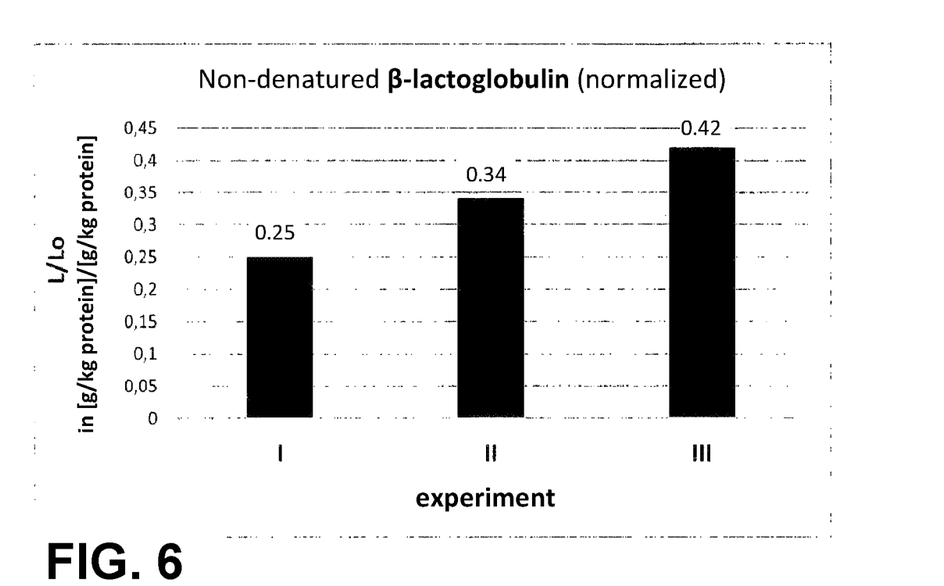
FIG. 6 is a graphical, normalized representation of the measured values for the content of non-denatured β-lactoglobulin, determined in Experiments I to III, from a protein-enriched milk product treated in the system according to the invention according to FIGS. 2, 4, and 5.

In FIG. 6, the normalized content of non-denatured β-lactoglobulin L/Lo [1] in the treated milk product P is shown for the Experiments I to III. Here, L represents the relevant measured value (β-LG) for the non-denatured β-lactoglobulin in g/kg protein (*) in the treated milk product P, which is based on Lo, wherein Lo is the reference value for the normalization and denotes the relevant measured value for the non-denatured β-lactoglobulin in the untreated milk product P (raw milk).

TABLE 2

| | Experiment | | | | | |
|---|---|---|---|---|---|---|
| | I Without cooling | | II With cooling | | III With cooling | |
| Constituents | Raw milk | TVE = 85° C./ Δt1 = 30s/without K/THE = 137.5° C./ Δt2 = 1s/TA = 83° C. | Raw milk | TVE = 85° C./ Δt1 = 30s/TK = 80° C./ THE = 137.5° C./ Δt2 = 1s/TA = 78.5° C. | Raw milk | TVE = 85° C./ Δt1 = 30s/TK = 75° C./ THE = 137.5° C./ Δt2 = 1s/TA = 73° C. |
| pH | 6.75 (12° C.) | 6.77 (9° C.) | 6.75 (10° C.) | 6.78 (02° C.) | 6.76 (11° C.) | 6.80 (11 ° C.) |
| Dry matter DM in % | 12.15 | 11.47 | 11.67 | 11.01 | 11.49 | 10.33 |
| Fat in % | 0.08 | 0.161 | 0.08 | 0.13 | 0.09 | 0.11 |
| Ash in % | 0.96 | 0.90 | 0.93 | 0.86 | 0.91 | 0.81 |
| Protein in % | 6.38 | 5.98 | 6.11 | 5.72 | 6.02 | 5.38 |
| β-LG in g/kg milk (*) | 8.35 | 1.92 | 6.90 | 2.20 | 6.85 | 2.55 |
| β-LG in g/kg protein (*) | 130.9 | 32.1 | 112.9 | 38.5 | 113.8 | 47.4 |
| Furosine in mg/kg milk | | | | | | |
| Furosine in mg/100 g protein | 2.66 | 9.44 | 2.78 | 9.39 | 2.66 | 8.36 |
| Lactulose in mg/kg milk | 9 | 53 | 8 | 44 | 6 | 50 |

(*): β-lactoglobulin (acid-soluble)

Result

The experiment results (Table 2) show that the indirect cooling K according to the invention in Experiment II (ΔTK=5 K→L/Lo=0.34) and in Experiment III (ΔTK=10 K→L/Lo=0.42) results in a desirable, unexpected, and surprising increase in the content of non-denatured β-lactoglobulin compared with Experiment I (without cooling K; ΔTK=0 K→L/Lo=0.25), wherein, under the other given process conditions in the system 1000, the cooling by ΔTK=10 K in Experiment III produces an optimal result (FIG. 6).

Figure 7:
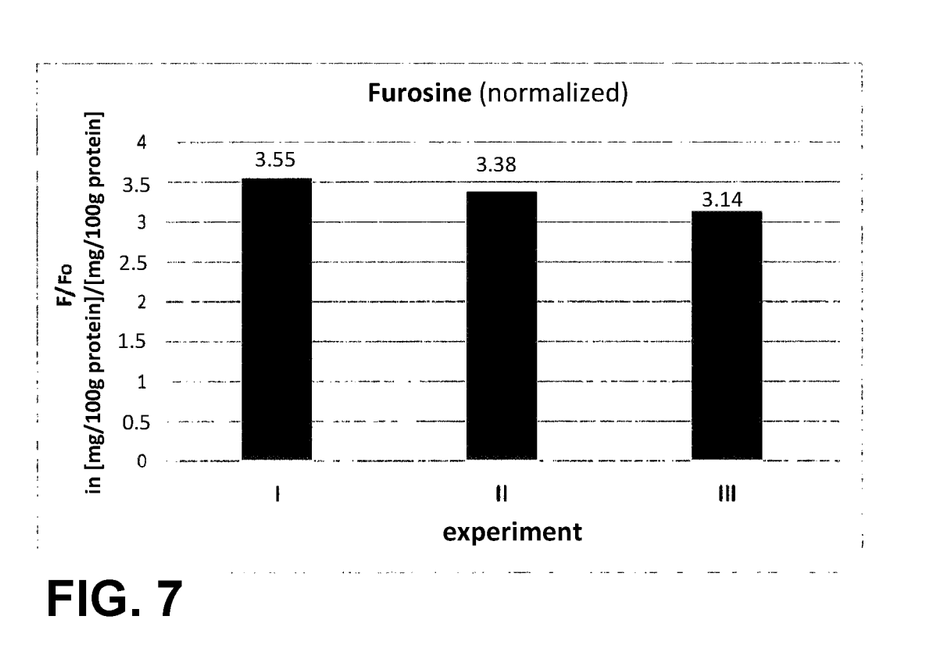
FIG. 7 is a graphical, normalized representation of the measured values for the content of furosine, determined in Experiments I to III, from a protein-enriched milk product treated in the system according to the invention according to FIGS. 2, 4, and 5.

In FIG. 7, the normalized content of furosine F/Fo [1] in the treated milk product P is shown for the Experiments I to III. Here, F represents the relevant measured value for the furosine in mg/100 g protein in the treated milk product P, which is based on Fo, wherein Fo is the reference variable for the normalization and denotes the relevant measured value for the furosine in the untreated milk product P (raw milk).

Result

The experiment results (Table 2) show that the indirect cooling K according to the invention in Experiment II (ΔTK=5 K→F/Fo=3.38) and in Experiment III (ΔTK=10 K→F/Fo=3.14) results in a desirable, unexpected, and surprising decrease in the content of furosine compared with Experiment I (without cooling K; ΔTK=0 K→F/Fo=3.55), wherein, under the other given process conditions in the system 1000, the cooling by ΔTK=10 K in Experiment III produces an optimal result.

It cannot be established with certainty based on Experiments I to III whether the increase in the content of β-lactoglobulin and the decrease in the content of furosine are solely attributable to the indirect cooling K according to the invention prior to the direct heating DE. It cannot be excluded that the observed differences, which are desirable, unexpected, and surprising, are predominantly attributable to the indirect cooling K according to the invention and, if anything, to a rather small extent on the required stronger cooling of the protein-enriched milk product P during the flash cooling FK (different exit temperatures 78.5° C. and 73° C. for Experiments II and III, respectively, compared with TA=83° C. for Experiment I).

However, this uncertainty does not appear to be essential to the invention, especially because Experiments II and III must necessarily end at different exit temperatures TA with respect to each other and in each case with respect to Experiment I. Said exit temperatures necessarily result from the condition set wherein water in an amount corresponding to that of previously supplied steam is removed from the high-temperature pasteurized milk product that has been kept at temperature by flash cooling by means of decompression to a lower pressure. Ultimately, the indirect cooling according to the invention is also the cause of this situation and is responsible for its possible effects.

Water in an amount corresponding to that of previously supplied steam is removed from the high-temperature pasteurized milk product that has been kept at temperature by flash cooling by means of decompression to a lower pressure can only be fulfilled depending on the amount of steam (preferably saturated steam) supplied in each case during the direct heating DE in Experiments I to III and thus necessarily with accordingly assigned, different exit temperatures TA. The flash cooling FK also includes the removal of the amount of water that is necessarily required as compensation by the relevant indirect cooling K process from the preheating temperature TVE to the cool-down temperature TK (enthalpy decrease), again in the form of an adequate amount of steam D during the direct heating DE from the cool-down temperature TK to the high pasteurization temperature THE (enthalpy increase).

The exit temperatures TA assigned to Experiments I to III (see Table 1) must necessarily be different to fulfill the condition set wherein water in an amount corresponding to that of previously supplied steam is removed from the high-temperature pasteurized milk product that has been kept at temperature by flash cooling by means of decompression to a lower pressure.

Experiment I (without Cooling)

In order to remove the amount of water W that corresponds to the amount of previously supplied steam D for the heating, from the preheating temperature TVE=85° C. to the high pasteurization temperature THE=137.5° C., from the high-temperature pasteurized milk product P during flash cooling FK, a saturation pressure $p_s$ or corresponding absolute pressure (low pressure with respect to atmospheric pressure) that allows the milk product P to boil at a saturation temperature $T_s(p_s)$=83° C., which also corresponds to the exit temperature TA, must be set in the vacuum apparatus 14 (see FIG. 2).

Experiment II (with Cooling; Cooling from TVE=85° C. to TK=80° C.; ΔTK=5 K)

The cooling of the milk product P by a temperature difference ΔTK=5 K requires a corresponding dissipation of heat or enthalpy decrease from or in the milk product P. This enthalpy decrease in Experiment II must be compensated during the direct heating DE by an additional supply of steam, preferably saturated steam, compared with Experiment I in order to arrive at the same high pasteurization temperature THE as in Experiment I (THE=137.5° C.).

To prevent the milk product P from being "watered down" by the additional supply of steam in Experiment II, an amount of water corresponding to the additional amount of steam must be removed from the milk product P in the vacuum chamber 14 by means of the so-called flash cooling FK in the form of vapors. This process takes place when the milk product P is in a state of saturation.

Experiment III (with Cooling; Cooling from TVE=85° C. to TK=75° C.; ΔTK=10 K)

The cooling of the milk product P by a temperature difference ΔTK=10 K requires a corresponding dissipation of heat or enthalpy decrease from or in the milk product P. This enthalpy decrease in Experiment III must be compensated during the direct heating DE by an additional supply of steam, preferably saturated steam, in an even higher amount compared with Experiment I and thus in a higher amount than in Experiment II to arrive at the same high pasteurization temperature THE as in Experiment I and Experiment II (THE=137.5° C.).

To prevent the milk product P from being "watered down" by the additional supply of steam in Experiment III to an even greater extent than in Experiment II, an amount of water corresponding to the additional amount of steam must be removed from the milk product P in the vacuum chamber 14 by means of the so-called flash cooling FK in the form of vapors. This process takes place when the milk product P is in a state of saturation.

Figure 8A:
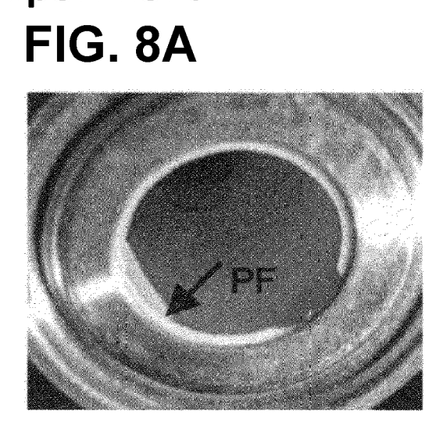

FIGS. 8A-10B qualitatively show, for Experiments I to III, in each case after a production time of 5 hours, the extent of the product fouling or of the fouling layer in the region of the system 1000 that is generally most critical, i.e., downstream of the outlet of the direct heating apparatus 8, 80 and, in this case, in the suction nozzle of the second conveying apparatus 10 (FIG. 2), which is easily accessible from a disassembly point of view. The photographs in FIGS. 8A and 8B are assigned to Experiment I, those in FIGS. 9A and 9B to Experiment II, and those in FIGS. 10A and 10B to Experiment III.

Figure 8B:
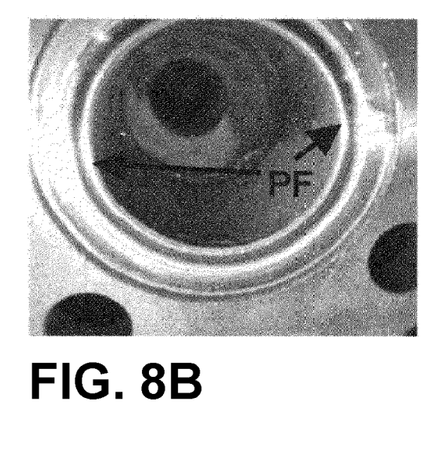

FIGS. 8A and 8B (Experiment I, without cooling K) show a continuous layer of fouling PF of a significant thickness after a production time of 5 hours, which impairs the transfer of heat and the general functioning of the system components in the high-temperature pasteurization regions in question. Production must be interrupted and the system 1000 cleaned after a production time of approximately 10 hours.

Figure 9A:
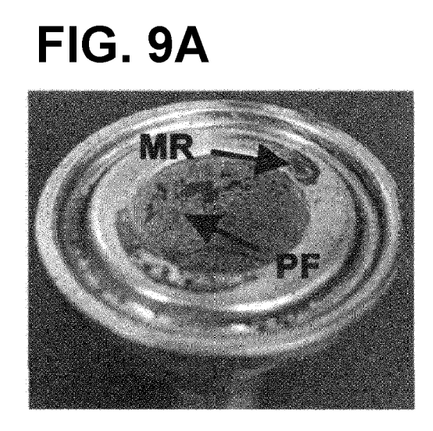
Figure 9B:
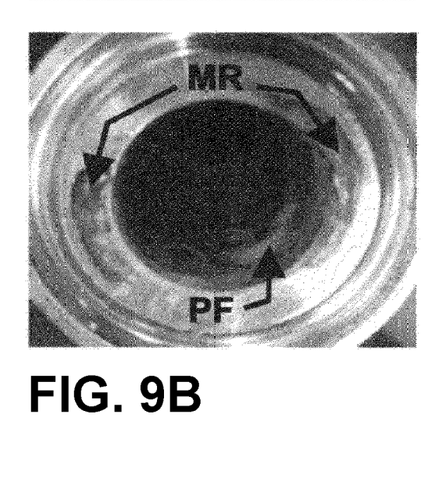

FIGS. 9A and 9B (Experiment II, with cooling K; ΔTK=5 K) show a circumferential colonization of the wall of the regions in question by a fouling layer PF of very moderate thickness that has a large number of island-like interruptions and that hardly impairs the transfer of heat and the general functioning of the system components in the high-temperature pasteurization regions in question, such that interruption to production and cleaning of the system 1000 is only required after a production time of up to 20 hours (production time approximately 2 to 3 times longer than in Experiment I).

Figure 10A:
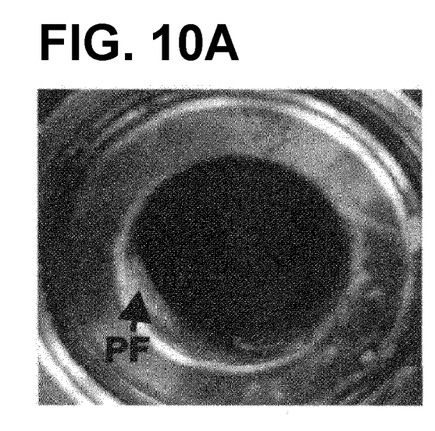
Figure 10B:
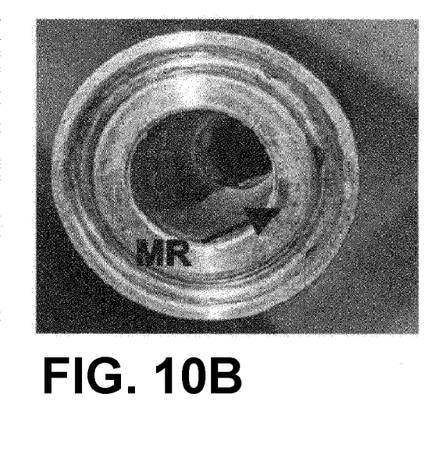

FIGS. 10A and 10B (Experiment III, with cooling K; ΔTK=10 K) show an island-like colonization of a very limited surface area on the walls in question by a fouling layer PF of moderate thickness that hardly impairs the transfer of heat and the general functioning of the system components in the high-temperature pasteurization regions in question, such that interruption to production and cleaning of the system 1000 is only required after a production time of up to 20 hours (production time approximately 2 to 3 times longer than in Experiment I).

The discernible darker areas on the end face of the suction nozzle in the black-and-white image in FIGS. 9A to 10B are slight deposits of the high-temperature pasteurized milk product P with brown or reddish-brown discolorations that are presumably caused by slight leaks at the flange connection and that point to a Maillard reaction MR of the milk product P.

The facts and results presented above in relation to the direct heating apparatus 8 designed as an infusion apparatus 80 can be applied analogously to a direct heating apparatus 8 designed as an injection apparatus 800 (FIG. 1, 2). A person skilled in the art who is familiar with the solution to the object according to the invention, or a process engineer or technologist specializing in dairy science or food processing engineering or dairy technology will be able to apply the teaching of the present invention without exercising inventive skill even to an injection method not set out in detail in this application and will be able to optimize said teaching with regard to the process parameters, which then still have to be determined.

The following is a list of reference numbers used in the drawings and this description, which reference to the figures in which they first appear.

FIG. 1 (PRIOR ART)

100 System according to the prior art
8 Direct heating apparatus
80 Infusion apparatus
800 Injection apparatus
2 Preheater
2a Heat transfer medium inlet
2b Heat transfer medium outlet
4 First holding tube
10 First conveying apparatus
12 Second holding tube
14 Vacuum apparatus
16 Second conveying apparatus
18 Milk product inlet (for milk product P to be treated)
20 First product line portion
22 Second product line portion
26 Steam inlet
28 Product inlet
30 Outlet pipe
32 Third product line portion
34 Fourth product line portion
36 Discharge line (for treated milk product P)
38 Vapor outlet
40 First coolant inlet
42 First coolant outlet
D Steam
DE Direct heating
FK Flash cooling
HE High-temperature pasteurization
HH1 First instance of keeping at temperature
HH2 Second instance of keeping at temperature
IFV Infusion method
IJV Injection method
K1 First coolant
M Heat transfer medium
P Milk product (protein-enriched)
TA Exit temperature (=T6)
TVE Preheating temperature (=T1, T2)
THE High pasteurization temperature (=T4, T5)
VE Preheating
W Water
Δt1 First dwell time
Δt2 Second dwell time

FIGS. 2 TO 4

1000 System
6 Cooler
6a Second coolant inlet
6b Second coolant outlet
K Cooling
K2 Second coolant
TA Cool-down temperature (=T3)
ΔTK Temperature difference
$p_s$ Saturation pressure
$T_s$ Saturation temperature

FIGS. 6 TO 10B

I First experiment (without cooling K)
II Second experiment (with cooling K)
III Third experiment (with cooling K)
F Furosine (measured value in mg/100 g protein)
Fo Furosine (measured value, reference value for normalization)
F/Fo Furosine (Normalized measured values in [mg/100 g protein]/[mg/100 g protein]=[1])
L Non-denatured β-lactoglobulin (measured value in g/kg protein)

Lo becomes (Measured value, reference value for normalization)

L/Lo Non-denatured β-lactoglobulin (Normalized measured values in [g/kg protein]/[g/kg protein]=[1])

MR Maillard reaction (browning)

PF Fouling layer (product fouling; formation of deposits)

The invention claimed is:

1. A method for directly heating a protein-enriched milk product by introducing steam into the protein-enriched milk product, wherein:
    (a) during direct heating, the steam heats the protein-enriched milk product to produce a high-temperature pasteurized protein-enriched milk product by means of direct high-temperature pasteurization to a high pasteurization temperature,
    (b) before the direct heating, the protein-enriched milk product is preheated indirectly to a preheating temperature and, following on from the preheating when viewed in a direction of flow of the protein-enriched milk product, a first instance of keeping the protein-enriched milk product at the preheating temperature is carried out for a defined and controlled first dwell time,
    (c) following on from the direct heating to the high pasteurization temperature when viewed in the direction of flow of the protein-enriched milk product, a second instance of keeping the protein-enriched milk product at the preheating temperature is carried out for a defined and controlled second dwell time,
    (d) flash cooling the protein-enriched milk product by means of decompression of the steam from a first pressure to a lower pressure, and removal of water from the high-temperature pasteurized protein-enriched milk product in an amount corresponding to that of the steam supplied to the high-temperature pasteurized protein-enriched milk product that has been kept at the preheating temperature, the protein-enriched milk product that is preheated indirectly and kept at the high pasteurization temperature is indirectly cooled before the direct heating by means of a recuperative cooling step so that a temperature difference between the preheating temperature and a cool-down temperature is in a range from 5 K to 10 K, the direct heating from the cool-down temperature to the high pasteurization temperature is controlled by means of adjusting direct heating setting parameters, and in accordance with the feature (d), the protein-enriched milk product is cooled by flash cooling from the high pasteurization temperature to an exit temperature.

2. The method according to claim 1, wherein:
the temperature difference is 10 K.

3. The method according to claim 1, wherein:
the direct heating setting parameters are pressure, temperature, and a duration of action of the steam.

4. The method according to claim 1, wherein:
the direct heating is achieved by means of an infusion method.

5. The method according to claim 1, wherein:
the direct heating is achieved by means of an injection method.

6. The method according to claim 2, wherein:
the direct heating setting parameters are pressure, temperature, and a duration of action of the steam.

7. The method according to claim 6, wherein:
the direct heating is achieved by an infusion method.

8. The method according to claim 2, wherein:
the direct heating is achieved by an injection method.

9. The method according to claim 3, wherein:
the direct heating is achieved by an infusion method.

10. The method according to claim 3, wherein:
the direct heating is achieved by an injection method.

* * * * *